(12) United States Patent
Steck et al.

(10) Patent No.: US 12,450,901 B2
(45) Date of Patent: Oct. 21, 2025

(54) SYSTEM AND METHOD FOR AUTOMATED OPTICAL ANALYTE MEASUREMENTS VIA WEARABLE SMART DEVICES

(71) Applicant: Roche Diabetes Care, Inc., Indianapolis, IN (US)

(72) Inventors: Alexander Steck, Hirschberg (DE); Bernhard Limburg, Soergenloch (DE); Fredrik Hailer, Limburgerhof (DE); Max Berg, Mannheim (DE)

(73) Assignee: Roche Diabetes Care, Inc., Indianapolis, IN (US)

( * ) Notice: Subject to any disclaimer, the term of this patent is extended or adjusted under 35 U.S.C. 154(b) by 7 days.

(21) Appl. No.: 18/640,369

(22) Filed: Apr. 19, 2024

(65) Prior Publication Data

US 2024/0265699 A1    Aug. 8, 2024

Related U.S. Application Data

(63) Continuation of application No. PCT/EP2022/079170, filed on Oct. 20, 2022.

(30) Foreign Application Priority Data

Oct. 22, 2021    (EP) .................................. 21204235

(51) Int. Cl.
*G06V 20/40*    (2022.01)
*G01N 21/78*    (2006.01)
(Continued)

(52) U.S. Cl.
CPC ............. *G06V 20/41* (2022.01); *G01N 21/78* (2013.01); *G01N 33/525* (2013.01);
(Continued)

(58) Field of Classification Search
CPC .......... H04N 7/18; H04N 7/185; G06V 20/41; G06V 40/10; G06V 20/60; G06T 7/0002;
(Continued)

(56) References Cited

U.S. PATENT DOCUMENTS

2015/0241358 A1    8/2015    Burg et al.
2016/0026253 A1*   1/2016    Bradski ................ H04N 13/128
                                                                 345/8
(Continued)

FOREIGN PATENT DOCUMENTS

| WO | 2015134820 A1 | 9/2015 |
| WO | 2019060276 A1 | 3/2019 |
| WO | 2020142655 A1 | 7/2020 |

OTHER PUBLICATIONS

International Search Report and Written Opinion, International Search Report and Written Opinion, pp. 1-12, Feb. 6, 2023.

*Primary Examiner* — Sherrie Hsia

(57) ABSTRACT

Systems and methods for measuring an analyte include devices configured to perform an analyte testing operation. The devices include a wearable electronic device and a remote device operatively connected to each other and each having a processor, the processors cooperating with each other in the execution of program instructions to measure an analyte. The wearable electronic device includes a camera configured to generate a video stream, which is analyzed to identify missing test components, to identify the application of a body fluid on a test strip where the sample undergoes changes in one or more optical properties, the image of which is analyzed to determine a level of the analyte. The wearable electronic device further includes a head-up display (HUD) for providing output messages to the user relating to the performance and status of the analyte testing operation.

18 Claims, 6 Drawing Sheets

(51) Int. Cl.
*G01N 33/52* (2006.01)
*G06T 7/00* (2017.01)
*G06V 20/60* (2022.01)
*G06V 40/10* (2022.01)

(52) U.S. Cl.
CPC ............ *G06T 7/0002* (2013.01); *G06V 20/60* (2022.01); *G06V 40/10* (2022.01); *G06T 2207/10016* (2013.01); *G06T 2207/10024* (2013.01); *G06T 2207/30004* (2013.01); *G06T 2207/30196* (2013.01); *G06T 2207/30204* (2013.01)

(58) Field of Classification Search
CPC . G06T 2207/10016; G06T 2207/10024; G06T 2207/30004; G06T 2207/30196; G06T 2207/30204; G01N 21/78; G01N 33/525
USPC ................. 348/158, 115; 345/7, 8; 340/980; 359/13, 630
See application file for complete search history.

(56) References Cited

U.S. PATENT DOCUMENTS

2016/0187651 A1\* 6/2016 Border .................... G06F 3/012
 345/8
2019/0195795 A1 6/2019 Cha et al.

\* cited by examiner

SYSTEM AND METHOD FOR AUTOMATED OPTICAL ANALYTE MEASUREMENTS VIA WEARABLE SMART DEVICES

CROSS REFERENCE TO RELATED APPLICATIONS

This application claims priority to and benefit of European Patent Application No. 21204235.2 (filed on Oct. 22, 2021), and is a continuation of International Patent Application No. PCT/EP2022/079170 (filed on Oct. 20, 2022). The contents of these applications are incorporated herein by reference in their entirety.

TECHNICAL FIELD

The disclosure relates generally to the field of analyte measurement systems, more specifically to optical measurement systems that assist a user in performing an analyte measurement process, and even more specifically to the use of wearable smart devices for conducting automated optical analyte measurements.

BACKGROUND

Analyte measurement systems that are known to the art enable the analysis of a bodily fluid dose provided by a user to identify the level of one or more analytes in the body of the user using an electronic device and one or more electrochemical reactions. These analyte measurement systems provide significant benefits for the accurate measurement of analytes in fluidic samples (i.e., biological or environmental) for individual users. Some analyte measurement systems employ a test strip that bears a chemical reagent. Upon receiving a fluid dose containing the analyte, a chemical reaction between the reagent and the analyte changes the color of the reagent, where the color change varies based on the concentration of the analyte, which in turn provides a measurement of the analyte. While many analytes are measured in this manner, one specific example of an analyte that is measured in a fluid dose is glucose, which is measured in a bodily fluid dose as part of monitoring and treatment of diabetes mellitus. Older test strip systems that measure analyte levels in a sample based on a detectable change in color have relied upon a human observer to judge the analyte measurement by observing the change in color in the reagent, often with the assistance of a printed color-matching guide. Such manual systems may present problems with reduced accuracy and inconsistent measurements based on the perceptions of different human observers. More recently, automated analyte measurement devices that use cameras to observe the reagent color change have been developed to help with improving the accuracy of the analyte measurement. For example, widely available smartphones include optical sensors, such as cameras, and digital image processing hardware that enable the smartphones to generate measurements of analytes in test strips when the smartphone executes a specifically configured analyte measurement software application.

Examples of systems and arrangements are known, e.g., from PCT/EP2019/080154 (published as WO2020/094594), wherein methods, computer programs, and devices are described which enable mobile devices to perform analytical measurements with increased measurement accuracy and improved reliability, while ensuring relatively convenient handling for a user. Such arrangements include methods wherein an optical test strip is provided having a test field without a sample applied to it (i.e. blank test field); capturing at least one image of a part or all of the blank test field using the camera of the mobile device (e.g. smartphone); applying a sample of bodily fluid to the test field (i.e. dosed test field); waiting a predetermined time for a color-changing reaction to take place; capturing a second image of part or all of the dosed test field using the camera of the mobile device (ensuring the same image acquisition settings are in place as when the image of the blank test field was captured); and determining an analytical measurement result value using the captured images.

To further enhance the accuracy and reliability of an analyte measurement performed in this way, additional developments are coming forth which include the use of a standard color reference which may further calibrate the camera of the mobile device based on captured images of such standard reference. For example, European Application No. 20173917.4 (as yet unpublished) discloses a color reference card as part of the kit for performing the analyte measurement. The disclosed method and arrangements in that case rely on the color reference to normalize the camera system of the mobile device according to perceived differences between measured reference color values and the known (pre-determined) color values of the color reference.

In other arrangements with or without a standard color reference, methods and devices can be configured to address other technical challenges of analytical measurements using mobile devices and increase measurement accuracy and improve reliability while still allowing convenient handling for the user. For example, methods of evaluating the suitability of a mobile device for performing an analytical measurement based on a color formation reaction are known wherein the mobile device has at least one camera, and such methods include steps for evaluating the suitability of a mobile device for performing an analytical measurement based on a color formation reaction. Further methods include calibrating a mobile device for performing the analytical measurement. Additionally, computer programs are provided wherein suitability evaluation, calibration, and measurement steps are performed by the mobile device. Such are known, e.g., from PCT/EP2019/079332 (published as WO2020/094436). Embodiments of such a system rely largely on programming the mobile device to perform the steps relating to, inter alia, the measurement, calibration, suitability evaluation, and color referencing. This is typically accomplished using a software application, or app, installed on the mobile device such as a smartphone or tablet device. The app functionality typically includes displaying the analyte measurement result on the device display. The app further may enable access to web or cloud based data management tools, healthcare records, and the like for enhanced disease management capabilities. As desired, the app may include programming that resides in the memory of the mobile device which causes the performance of the steps leading to accurate and reliable measurement results. Alternatively, the app programming may direct the mobile device to interface with a storage location remote from the mobile device, such as a remote computer server, in order to download the programming instructions for performing the measurement steps. In the latter instance, a reliable connection of the mobile device to the internet is required.

While the use of specifically configured optical measurement devices improves the analyte measurement, challenges remain in ensuring the ease of use and accuracy of the measurement process. One such challenge occurs in connection with proper angling, positioning and/or distancing of the smartphone optical sensor relative to a dosed test strip at the time an image of the dosed test strip should be captured, to ensure a robust digital image processing technique. A smartphone camera that is held too close or too far away from the dosed strip at the time of image capture may not provide proper image resolution. Similarly, a smartphone camera that is pointed toward the dosed test strip at too much of an angle may result in a skewed image which causes unbalanced or inconsistent color saturation, specular reflections, problems with depth-of-field (which can occur with or without the use of a color reference card if not all areas of the card are simultaneously in focus), and problems with spacial resolution, such as one axis being compressed due to an improper angle of the camera relative to a measurement area of a dosed test strip. Any of these situations may lead to inaccurate analyte measurement results. Another such challenge occurs in connection with the placement of a dosed test strip on a surface in order for a user to hold and manage the smartphone in the proper position for image capture. Placement of a test strip dosed with a bodily fluid such as blood onto a flat surface risks contamination of the surface. Another such challenge is the discontinuous nature of the analyte measurement process. The process requires continuous confirmation of the user on their smartphone in order to transmit the current status to the software. Additionally, the equipment used for the process is stored at each status check, which interrupts the natural flow of the measurement process. Consequently, an improvement to optical analyte measurement systems that overcome these challenges would be beneficial.

SUMMARY

Embodiments of the present disclosure are directed to systems and methods for measurement of an analyte, wherein a user is equipped with a wearable electronic device and a remote device, the wearable electronic device comprising a camera configured to generate a video stream; a first communication transceiver configured to transmit and receive communications to and from a second communication transceiver at the remote device; a head-up display (HUD); a first memory configured to store program instructions; and a first processor operatively connected to the first communication transceiver, the camera, and the first memory, the first processor being configured to execute the program instructions. The remote device comprises a second memory configured to store program instructions; and a second processor operatively connected to the second transceiver and the second memory, the second transceiver configured to transmit and receive communications to and from the first communication transceiver. The wearable electronic device and the remote device are operatively connected to each other, wherein the first processor and second processor cooperate to execute the program instructions to identify test components in the video stream and provide guidance to the user via the HUD of required test components not detected in the video stream; identify the application of a bodily fluid sample to a deposit site on a test strip based on the video stream; activate a timer in response to confirmation of the application of the bodily fluid sample; after a minimum period of time and before a maximum period of time from the activation of the timer, generating via the camera at least one image of the test strip including at least a portion of a measurement site, the at least one image being captured after guidance to the user via the HUD for positioning the test strip a predetermined distance and angular orientation relative to the camera; analyze optical properties of at least a portion of the measurement site within the image to determine a level of an analyte; and display the level of the analyte on the HUD.

In at least one embodiment, the program instructions proceed with executing the analyte testing operation based on one or more inputs from the user upon completion of at least one of the steps of application of the bodily fluid sample to a deposit site of the test strip and generating the at least one image.

In at least one embodiment, the program instructions proceed based on an automatic tracking of user activities and automatic identification of components required for the analyte testing operation, at least one of the first processor and second processor being configured for performing the automatic tracking and automatic identification via a video stream generated by the camera.

In at least one embodiment, at least one of the first and second processors is further configured to identify a vial in the video stream generated by the camera based on at least one registration mark located on the vial depicted in the video stream; to identify an opening of the vial in the video stream based on at least one registration mark located on a lid of the vial; and identify extraction of the test strip from the vial after the identification of the opening of the vial in the video stream based on at least one registration mark associated with the test strip depicted in the video stream.

In at least one embodiment, the registration marks associated with the vial or the lid or the test strip comprise an indicator formed on a surface, such as on a label of the vial, an interior surface of the lid, or surface of the test strip or a color card holding the test strip.

In at least one embodiment, at least one of the first and second processors is further configured to identify that a reverse side of the test strip is exposed in the video stream based on an absence of the indicator formed on the surface of the test strip; and generate on the HUD an output message indicating that the test strip should be rotated to expose the surface of the test strip bearing the indicator.

In at least one embodiment, at least one of the first and second processors is further configured to identify errors in extraction and handling of the test strip depicted in the video stream and provide guidance to the user via the HUD based on the identified errors.

In at least one embodiment, the step of identifying the application of a bodily fluid sample occurs following guidance to the user via the HUD for correct application of the bodily fluid to the test strip.

In at least one embodiment, at least one of the first and second processors is further configured to identify a finger of a user in the video stream; generate guidance on the HUD for producing a bodily fluid sample following identification of the finger in the video stream; identify contact between the finger and the deposit site in the video stream; and identify the application of the fluid sample in response to a change in an optical property of the deposit site in the video stream after the contact between the finger and the deposit site.

In at least one embodiment, at least one of the first and second processors is further configured to identify the application of the fluid sample in response to a change in an optical property of the deposit site in the video stream.

In at least one embodiment, at least one of the first and second processors is further configured to generate on the HUD an output message or image informing the user that the measurement of the analyte in the fluid sample cannot be completed in response to no optical measurement of the measurement site being generated after the predetermined minimum time period has elapsed and prior to the predetermined maximum time period elapsing.

In at least one embodiment, the remote device further comprises a display operatively connected to the second processor, and wherein the operation further comprises displaying the level of the analyte on the display. The remote device in at least one embodiment comprises a mobile electronic device. Further, the mobile electronic device, in at least one embodiment, comprises a smartphone where the program instructions comprise a software application stored on the second memory and executed by the second processor in communication with the first processor for directing the wearable electronic device in the performance of the analyte testing operation.

BRIEF DESCRIPTION OF THE DRAWINGS

The advantages, effects, features and objects other than those set forth above will become more readily apparent when consideration is given to the detailed description below as well as reference given to the following drawings, wherein.

DETAILED DESCRIPTION

Figure 1:
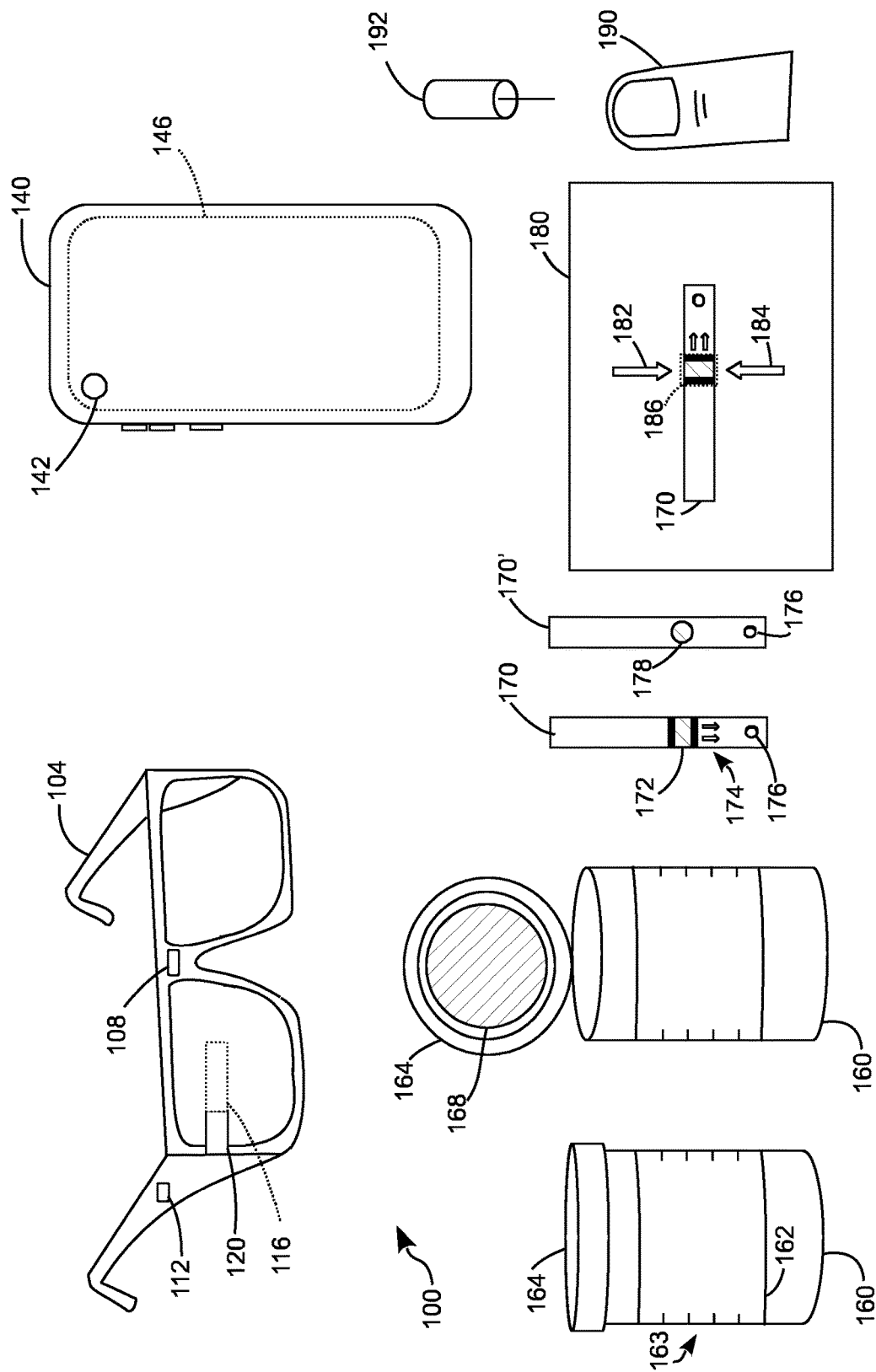
FIG. 1 is a diagram depicting components in an analyte measurement system that uses a wearable electronic device and a mobile electronic device to identify various aspects of a measurement kit and performance of various steps during an analyte measurement process.

In the description, reference is made to the accompanying drawings, which form a part hereof and in which there is shown by way of illustration, not limitation, embodiments of the inventive concept. Corresponding reference numbers indicate corresponding parts throughout the several views of the drawings.

While the inventive concept is susceptible to various modifications and alternative forms, exemplary embodiments thereof are shown by way of example in the drawings and are herein described in detail. It should be understood, however, that the description of exemplary embodiments that follows is not intended to limit the inventive concept to the particular forms disclosed, but on the contrary, the intention is to cover all advantages, effects, and features falling within the spirit and scope thereof as defined by the embodiments described herein and the embodiments below. Reference should therefore be made to the embodiments described herein and embodiments below for interpreting the scope of the inventive concept. As such, it should be noted that the embodiments described herein may have advantages, effects, and features useful in solving other problems.

The devices, systems and methods now will be described more fully hereinafter with reference to the accompanying drawings, in which some, but not all embodiments of the inventive concept are shown. Indeed, the devices, systems and methods may be embodied in many different forms and should not be construed as limited to the embodiments set forth herein; rather, these embodiments are provided so that this disclosure will satisfy applicable legal requirements. Likewise, many modifications and other embodiments of the devices, systems and methods described herein will come to mind to one of skill in the art to which the disclosure pertains having the benefit of the teachings presented in the foregoing descriptions and the associated drawings. Therefore, it is to be understood that the devices, systems and methods are not to be limited to the specific embodiments disclosed and that modifications and other embodiments are intended to be included within the scope of the embodiments. Although specific terms are employed herein, they are used in a generic and descriptive sense only and not for purposes of limitation.

Unless defined otherwise, all technical and scientific terms used herein have the same meaning as commonly understood by one of skill in the art to which the disclosure pertains. Although any methods and materials similar to or equivalent to those described herein can be used in the practice or testing of the methods, the preferred methods and materials are described herein. Moreover, reference to an element by the indefinite article "a" or "an" does not exclude the possibility that more than one element is present, unless the context clearly requires that there be one and only one element. The indefinite article "a" or "an" thus usually means "at least one." Likewise, the terms "have," "comprise" or "include" or any arbitrary grammatical variations thereof are used in a non-exclusive way. Thus, these terms may both refer to a situation in which, besides the feature introduced by these terms, no further features are present in the entity described in this context and to a situation in which one or more further features are present. For example, the expressions "A has B," "A comprises B" and "A includes B" may refer both to a situation in which, besides B, no other element is present in A (i.e., a situation in which A solely and exclusively consists of B) or to a situation in which, besides B, one or more further elements are present in A, such as element C, elements C and D, or even further elements.

As used herein, the term "mobile electronic device" refers to a portable computing device that provides a user one or more of each of the following components: an output device, an input device, a memory, and a wireless communication device that are controlled by one or more processors in the mobile electronic device. As used herein, the term "wearable electronic device" refers to a type of mobile electronic device that is further adapted to be worn by a human user in a similar manner to glasses, clothing, watches, or jewelry. Examples of output devices include, but are not limited to, liquid crystal display (LCD) displays, organic or inorganic light emitting diode (LED) displays, and other forms of graphical display device, audio speakers, and haptic feedback devices. Examples of input devices include, but are not limited to buttons, keyboards, touchscreens, acute vibration sensors, still and video cameras, and audio microphones. Examples of memory include, but are not limited to, both volatile data storage devices such as random-access memory (RAM) and non-volatile data storage devices such as magnetic disks, optical disks, and solid-state storage devices including EEPROMs, NAND flash, or other forms of solid-state data storage devices. Examples of wireless communication devices include, but are not limited to, radio transceivers that operate with the Near Field Communication (NFC) protocol, the Bluetooth protocol family, including Bluetooth Low Energy (BLE), the IEEE 802.11 protocol family ("Wi-Fi"), and cellular data transmission standards ("4G," "5G," or the like). Examples of the processors include digital logic devices that implement one or more central processing units (CPUs), graphics processing units (GPUs), neural network processors (NPUs), digital signal processors (DSPs), field programmable gate arrays (FPGAs), application specific integrated circuits (ASICs), and any other suitable digital logic devices in an integrated device or as a combination of devices that operate together to implement the processor. Common examples of mobile electronic devices include, but are not limited to, smartphones, tablet computing devices, and notebook computers. Common examples of wearable electronic devices include, but are not limited to, smart watches and smart glasses.

FIG. 1 depicts an analyte measurement system 100 that includes a wearable electronic device 104 and a remote device 140. Throughout this disclosure, described embodiments typically refer to an operatively connected arrangement of the wearable electronic device 104 and the remote device 140 which may typically take the form of a mobile electronic device such as a smartphone or a tablet device. However, as will become clear from this description, it should be noted that the remote device 140 may be substituted effectively by a remote internet-based device (e.g. remote server accessed via internet connection) such that the wearable device 104 interacts directly with such remote device in the same or substantially similar manner as with a mobile electronic device as the remote device 140, provided that the wearable device 104 has an adequate connection to the internet via a suitable wireless communication device such as described above. Any software application described herein relating to the functioning of the remote device 140 may also be sufficiently executed by the remote internet-based device to which the wearable device 104 is operatively connected.

Figure 2:
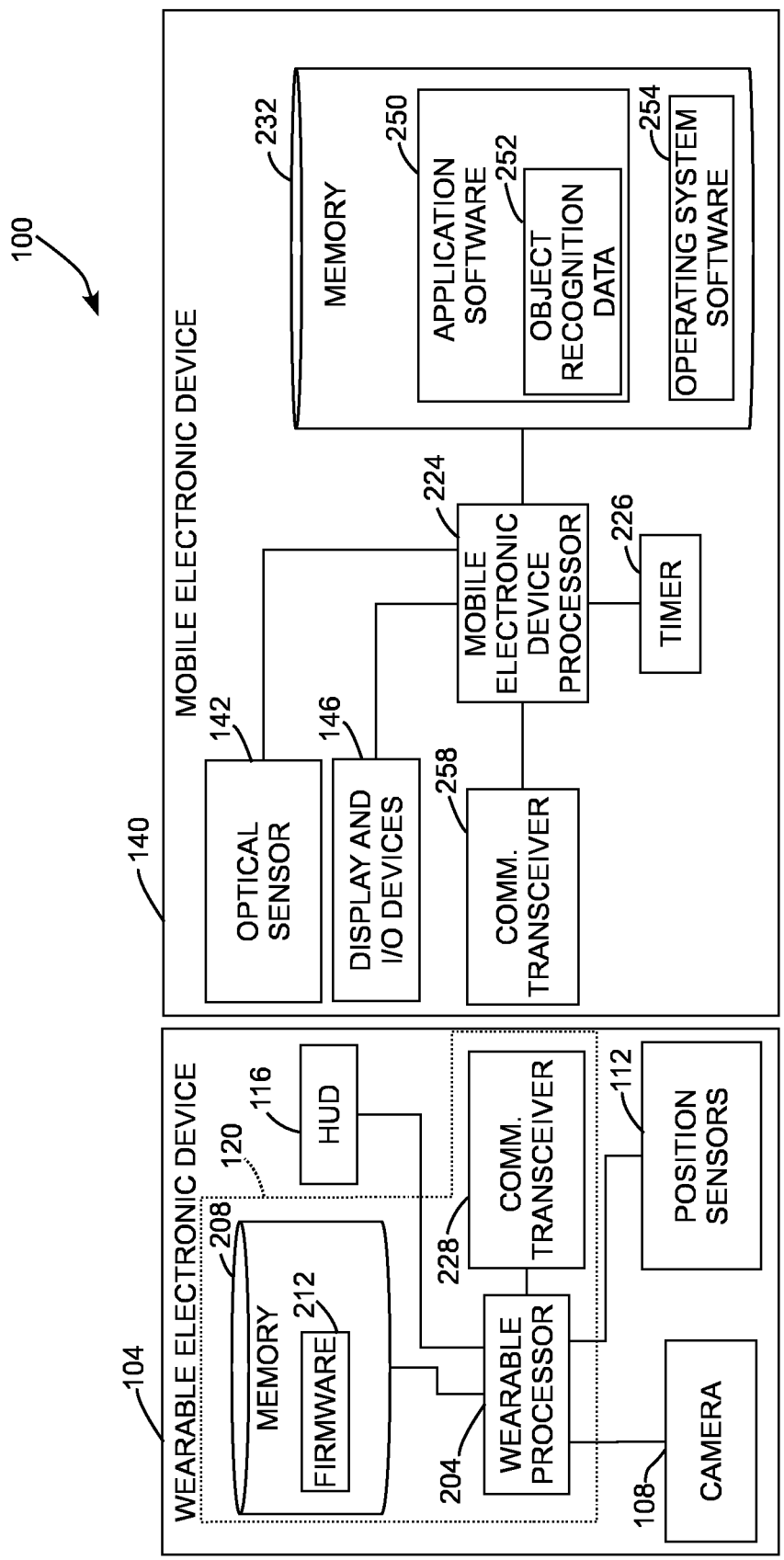
FIG. 2 is a schematic diagram depicting components of the wearable electronic device and mobile electronic device of FIG. 1.

Referring to FIG. 1 and to a schematic diagram in FIG. 2, in one embodiment of the system 100 the wearable electronic device 104 is embodied as a pair of eye glasses, also referred to as "smart glasses", although other forms of wearable electronic devices including smart watches may be used in alternative configurations. The wearable electronic device 104 includes a frame and optional lenses that are similar to a conventional pair of eye glasses. The wearable electronic device 104 further includes a camera 108, positional sensors 112, and a head-up display (HUD) 116, that are each operatively connected to an electronic control unit 120. The camera 108 is, for example, a CMOS or other suitable digital imaging device that generates images and video streams of the region in front of the wearable electronic device 104 that corresponds to the view of the person wearing the wearable electronic device 104. In some embodiments, a single monochrome or color camera generates the video stream as a two-dimensional video stream. In other embodiments, the camera 108 is further configured to generate a video stream that provides three-dimensional object data. For example, in one configuration the camera 108 further comprises two or more cameras that provide stereoscopic video or the camera 108 includes a depth sensor that provides three-dimensional depth information corresponding to objects in the video stream. The positional sensors 112 include, for example, a microelectromechanical (MEMs) three-axis gyroscope and one or more accelerometers that provide data to identify the spatial orientation of the wearable electronic device 104 during operation. The HUD 116 provides visual outputs to the wearer without requiring the wearer to change his or her gaze to a particular display device. While FIG. 1 depicts a HUD 116 that is separate from the glass lenses in the wearable electronic device 104, alternative configurations provide one or more visual display devices that are integrated into the lenses or that project graphical outputs onto the lenses. While not depicted in further detail, the wearable electronic device 104 optionally includes audio input and output devices as well which may be located, for example, in the earpieces, wherein sounds and audible communication may be conveyed to a user, and/or a user may provide voice commands for input to and interaction with the wearable electronic device 104. In such embodiments, the wearable electronic device 104 comprises a microphone operatively connected to the processor 204, which is able to execute voice recognition programming to convert a user's audible commands into actionable inputs, such as starting an analyte measuring operation or indicating completion of various actions associated with such an operation.

Referring now to FIG. 2, the electronic control unit 120 houses at least one wearable electronic device processor 204 that is operatively connected to the camera 108, the positional sensors 112, and the HUD 116. The electronic control unit 120 further houses a memory 208 and a communications transceiver 228 that are operatively connected to the processor 204. In the embodiment of FIG. 2, the memory 208 stores firmware instructions 212 that control the operation of the wearable electronic device 104. The communications transceiver 228 includes a transmitter that enables transmission of data, including a video stream and one or more images, to a corresponding communications transceiver 258 in the remote device 140 or in a wireless connection device configured for bi-directional communication with the remote device (e.g. local WiFi communication signal via a signal router operatively connected to the internet). The communications transceiver 228 further includes a receiver that enables the wearable electronic device 104 to receive data originating from the remote device 140, and, in particular, to receive messages from the remote device 140 for display to a user via the HUD 116. In the illustrative example of FIG. 2, the communications transceiver 228 is a Bluetooth or Bluetooth low-energy wireless data communications transceiver, although alternative configurations may use a different wireless communication standard or may employ a wired connection interface such as Universal Serial Bus (USB).

Referring to FIG. 1 and to a schematic diagram in FIG. 2, in one embodiment of the system 100 the remote device 140 further includes a processor 224 that is operatively connected to a timer 226, a memory 232, a communication transceiver 258, and one or more display and user input/output (I/O) devices 146. The remote device 140 is operatively connected to the wearable electronic device 104. In other embodiments as will be understood, the wearable processor 204 is configured with analogous components to the processor 224 of the remote device 140 in order for the wearable electronic device 104 to perform the functions described herein pertaining to conducting an analyte measurement.

Remote device 140 may include an optical sensor 142 operatively connected to processor 224 as part of its standard features such as is typically provided in a smartphone or tablet device. However, it will be seen according to the embodiments of the present disclosure that an optical sensor on the remote device 140 is not essential. Nevertheless, for illustrative purposes, alternative embodiments for inventions described in related but separate applications for patents filed by the inventors hereof contemporaneously herewith, an optical sensor 142 provided on remote device 140 comprises a digital camera that generates still images or video streams. According to embodiments of the present disclosure, camera 108 is configured to generate images and video streams relating to the conducting of an analytical measurement according to a sequence of steps which may be initiated directly with the wearable electronic device 104 or by user operation of an app on remote device 140 operatively connected to the wearable electronic device 104. For example, when a sequence is initiated, the camera 108 may generate a video stream of a user obtaining a vial 160 of test strips 170, removing one such test strip 170, and, optionally, positioning a color card 180 to generate at least one optical measurement for analysis to measure the analyte level in a bodily fluid dose that is later applied to the test strip 170. In the configuration of FIG. 1, the camera 108 is configured for the generation of a video stream that captures the overall scene including the vial 160, the test strip 170 and the deposit site 172, optionally the color card 180, and the finger 190 for identification of the moment at which the test strip 170 receives a fluid dose. The camera 108 is further configured to generate one or more images of the measurement site 178 on the reverse side of the test strip 170' at the appropriate time after the moment of application of the bodily fluid dose to provide an input to an analyte measurement process due to the image(s) having optically measurable properties from which an optical measurement is possible. The optical measurement is, for example, discernable from a digital photograph that includes the measurement site 178 on the test strip 170'. As such, the camera 108 provides a broader view of multiple elements that are used in the analyte testing process, as well as the more detailed digital images or video of the reagent on the test strip 170 and optionally the calibration data that are provided on the color card 180. For example, camera 108 may be configurable to generate a video stream with a reduced resolution for identification and tracking of the vial 160, the test strip 170, the color card 180, and the finger 190 to enable the remote device 140 to identify the moment at which the test strip 170 receives the fluid dose. Subsequently, the camera 108 may operate at a higher resolution to capture one or more high-fidelity images of the test strip 170' either alone or in conjunction with the color card 180 to provide an input for the analyte measurement process.

In one embodiment of the remote device 140, the user input/output (I/O) devices 146 include a touchscreen display device that provides a graphical output to a user and receives touch inputs to control the operation of the remote device 140 and, more particularly, to provide input to the analyte measurement process. Other examples of I/O devices include microphones for speech input and speakers for audio output, mechanical buttons, and the like. In some configurations, the wearable electronic device 104 implements user I/O devices 146 such as an audio input device or gesture tracking input device that uses the camera 108 to record inputs from the user that the camera 108 transmits to the remote device 140. The wearable electronic device 104 may further receive output data from the remote device 140 for display to the user via the HUD 116.

In the remote device 140, timer 226 enables the processor 224 to maintain a count of elapsed time during operation, which includes counting an elapsed time starting at the moment the test strip 170 receives a bodily fluid dose, to ensure that optical measurements of the reagent for analyte measurement occur after a predetermined minimum time has elapsed and before a predetermined maximum time has elapsed. While the timer 226 is depicted as a discrete component for illustrative purposes, in many practical embodiments the timer 226 is integrated into the processor 204, 224 as a timer circuit or is implemented as a software timer.

In FIG. 1, the test strip 170 includes a deposit site 172 where a user provides a bodily fluid sample such as liquid blood, which may be generated using lancing device 192. The test strip 170 may also include registration marks 174, which are depicted as printed marks in the form of arrows on the surface of the test strip 170 at a predetermined position relative to the deposit site 172. A hole 176 is also formed through one end of the test strip 170. The registration marks 174 enable efficient identification and tracking of the test strip 170, including identification of which side of the test strip 170 faces the camera in the video stream. In the illustrative example of FIG. 1, only one side of the test strip 170 is configured to receive the blood sample and the registration marks 174 are formed only on this side of the test strip 170, although in alternative embodiments a test strip may be configured to receive a blood dose on either side of the test strip. In FIG. 1, the test strip 170' is the same test strip 170, but with the reverse side in view including the measurement site 178 and the hole 176, but without the arrow indicators 174, and in some embodiments the system 100 can detect that the reverse side of the test strip 170' is exposed to the camera 108. In the test strip 170/170', the deposit site 172 provides a fluid inlet that enables a fluid dose to permeate through one or more internal layers in the test strip to enable chemical reactions with one or more reagents in the test strip. Examples of internal layers include, for example, filters and different layers of chemical reagents that react to one or more analytes in the fluid dose. The measurement site 178 is an optically exposed region formed on the reverse side 170' of the test strip that changes color in response to the level of analyte in the fluid dose that permeates through the test strip from the deposit site 172. In one configuration, the reagent is exposed at the measurement site 178 directly, while in another configuration an optically transparent layer, such as a film, covers the reagent while providing an optical aperture to enable generation of optical measurements of the reagent to detect changes in the color of the reagent due to exposure with the analyte in the fluid dose.

In the remote device 140, the memory 232 includes one or more non-volatile and volatile data storage devices. In the configuration of FIG. 2, the memory 232 stores application software 250 and operating system software 254 that both contain instructions for execution by the remote device processor 224. The application software 250 includes instructions that implement a user interface and an analyte analysis program to perform the analyte measurement process based on an image analysis of one or more optical measurements of the reagent on the test strip 170. The application software 250 also stores predetermined minimum and maximum elapsed time thresholds to ensure that the optical measurements are generated after the fluid dose has had sufficient time to react with the reagent in the test strip 170 but before a maximum useful time period for measuring the analyte has elapsed. As described in further detail below, part of the analyte measurement process includes the identification of the vial 160, removal of the test strip 170, and the identification of contact between the finger 190 and the test strip 170 to apply the fluid dose to the deposit site 172. The application software 250 further includes object recognition data 252 that enable the processor 224 to perform automated object identification and tracking of the vial 160, test strip 170, color card 180 and lancing device 192 in the video stream that is received from the wearable electronic device 104. The object recognition data 252 are generated through a training process that occurs prior to distribution of the application software 250. In particular, the training process utilizes the predetermined shapes, colors, and patterns of registration marks formed on the vial 160, test strip 170, and the color card 180 to enable automated identification and tracking of these components in a video stream. Examples of the object recognition data 252 include image classifiers such as neural networks, particularly convolutional neural networks, support vector machines, hidden Markov models, one-dimensional and two-dimensional barcode scanning engines, and the like. Additionally, the object recognition data 252 may include filters for color detection and edge detection along with other image processing data needed for tasks such as object detection and image segmentation to enable tracking of objects such at the vial 160, test strip 170, and color card 180 in the video stream. The operating system (OS) software 254 includes the software kernel, drivers, libraries, and other system software that are associated with a standard commercially-available operating system. The OS software 254 provides standardized services such as network and graphics stacks, file systems for data storage and management, software access to the display and I/O devices 146, timer 226, communications transceiver 258, and other components in the remote device 140.

In the remote device 140, the communications transceiver 258 includes a transmitter that enables transmission of data, including command data and output message data, to the corresponding transceiver 228 in the wearable electronic device 104. The communications transceiver 258 further includes a receiver that enables the remote device 140 to receive data from the mobile electronic device 140, and, in particular, to receive a video stream from the camera 108 in the wearable electronic device 104. In the illustrative example of FIG. 2, the communications transceiver 258 is a Bluetooth or Bluetooth low-energy wireless data communications transceiver, although alternative configurations may use a different wireless communication standard or may employ a wired connection interface such as USB.

FIG. 1 further depicts a vial 160 and a color card 180. The vial 160 stores one or more of the test strips 170. In addition to providing storage, the vial 160 protects the test strips from contamination in the environment, which includes preventing the reagents in the test strips 170 from absorbing excessive amounts of moisture from the ambient environment. The vial 160 includes a printed label 162 that further bears one or more registration marks, which are depicted as the dashed line indicators 163 that are printed along one or more edges of the label 162 in FIG. 1. The registration marks form a simple visual indicator that enables efficient identification and tracking of the vial 160 in a video stream that the wearable electronic device 104 generates and transmits to the mobile electronic device 140. The registration marks 163 are widely distributed on the exterior of the vial 160 to enable identification and tracking of the vial 160 from a wide range of viewing angles and when the hand of a user holds the vial 160. Alternative embodiments of registration marks for the vial 160 include, for example, alternative printed pattern indicators including barcodes, or engraved or embossed geometric shapes that are formed on the exterior of the vial 160 that assist in automated identification and tracking of the vial 160. In the embodiment of FIG. 1, a lid 164 provides access to the interior of the vial 160. The lid 164 may be fully removable or may remain attached to the body of the vial 160 while opened. In either configuration, a second registration mark 168 is formed on the interior surface of the vial lid 164. The second registration mark 168 is, for example, a circle or other geometric shape formed with a predetermined color that contrasts with the color of the vial 160 to provide a clear indication that the vial 160 has been opened in the video stream that the wearable electronic device 104 generates during use of the vial 160. In alternative embodiments, the registration mark 168 is a one or two dimensional barcode or other registration mark that is identifiable to automated vision algorithms. The registration marks 163 and 168 enable accurate identification of both the vial 160 and a determination of when the vial 160 is closed and opened.

According to embodiments of the disclosure, during operation, the wearable electronic device 104 generates a video stream that enables tracking various activities and actions relating to an analytical measurement process. For example, upon initiation of a measurement sequence (which initiation may be performed using the wearable electronic device 104 or an open app or software program running on the remote device 140), wearable electronic device may track the test components for the analytical measurement process, including vial 160, color card 180 and lancing device 192. The wearable electronic device 104 then may utilize the (HUD) 116 to generate instructions to the user as to test components not tracked. Further, wearable electronic device 104 may also identify light conditions, which might interfere with the analytical measurement and utilize the HUD 116 to generate a message to the user regarding the unfavorable conditions.

In at least one embodiment, wearable electronic device 104 may track a vial 160 that holds one or more test strips 170 to identify when a test strip 170 is removed from the vial, placed in relation to a color reference card, and receives a fluid dose, such as a blood dose from a finger 190 of human test subject. The wearable electronic device 104 then may utilize the (HUD) 116 to provide instructions to a user for the step-by-step process of the performance of an analyte measurement. For example, the HUD 116 may instruct the user to prepare for a measurement and then scan the area in the view of the camera 108. As described in further detail below, the system 100 starts a timer upon detection of application of a fluid dose to a deposit site 172 on the test strip 170, and instructs the user via the HUD 116, after a predetermined minimum time has elapsed and prior to a predetermined maximum time elapsing, to capture an image using the camera 108 which is transmitted to the remote device 140 to generate optical measurements of the deposit site 172 on the test strip 170.

During operation, the camera 108 captures an image from which to detect a color change in the reagent that is visible to the measurement site 178 on the test strip 170' in response to one or more chemical reactions with the analyte in the fluid dose. In the illustrative example of FIG. 1, the change in color of the reagent located at the measurement site 178 indicates a level of glucose analyte in the blood sample. As described above, the system 100 identifies when the deposit site 172 receives the fluid dose and uses a timer to determine when an optical sensor should generate subsequent optical measurements of the measurement site 178 to ensure an accurate measurement of the blood glucose level. While the system 100 depicts a test strip that includes a separate deposit side 172 and measurement site 178 for illustrative purposes, those of skill in the art will recognize that alternative test strips provide a single deposit site and measurement site with the reagent that are co-located on the same region of the test strip. As such, in some embodiments the deposit site and reagent occupy separate locations on the test strip while in other embodiments the deposit site and the reagent refer to a single location of the test strip.

In FIG. 1, the color card 180 is an optional component that has a rear side depicted in FIG. 1 that holds the test strip 170 in place prior to dosing. The color card 180 also has a front side (not shown) that includes a predetermined arrangement of colors and other fiducial markings that assist in calibrating images from the camera 108 for accurate color measurement of the exposed measurement site 178. An aperture 186 in the color card 180 enables the measurement site 178 on the opposite side of the test strip 170' to be measured by the optical sensor within the color pattern of the color card 180. The rear side of the color card 180 includes registration marks 182 and 184, which are depicted as arrow indicators that are printed on the rear side of the color card 180 in the illustrative embodiment of FIG. 1. The registration marks 182 and 184 are associated with the test strip 170 and further assist in identifying and tracking the test strip 170 in the video stream to detect when the test strip 170 receives the fluid dose. The color card 180 is optional, and the system 100 is configured to generate optical measurements of the reagent at the measurement site 178 in the test strip 170' to measure the glucose analyte in a blood sample or another type of analyte using the test strip 170' in isolation or in conjunction with the color card 180.

Figure 3:
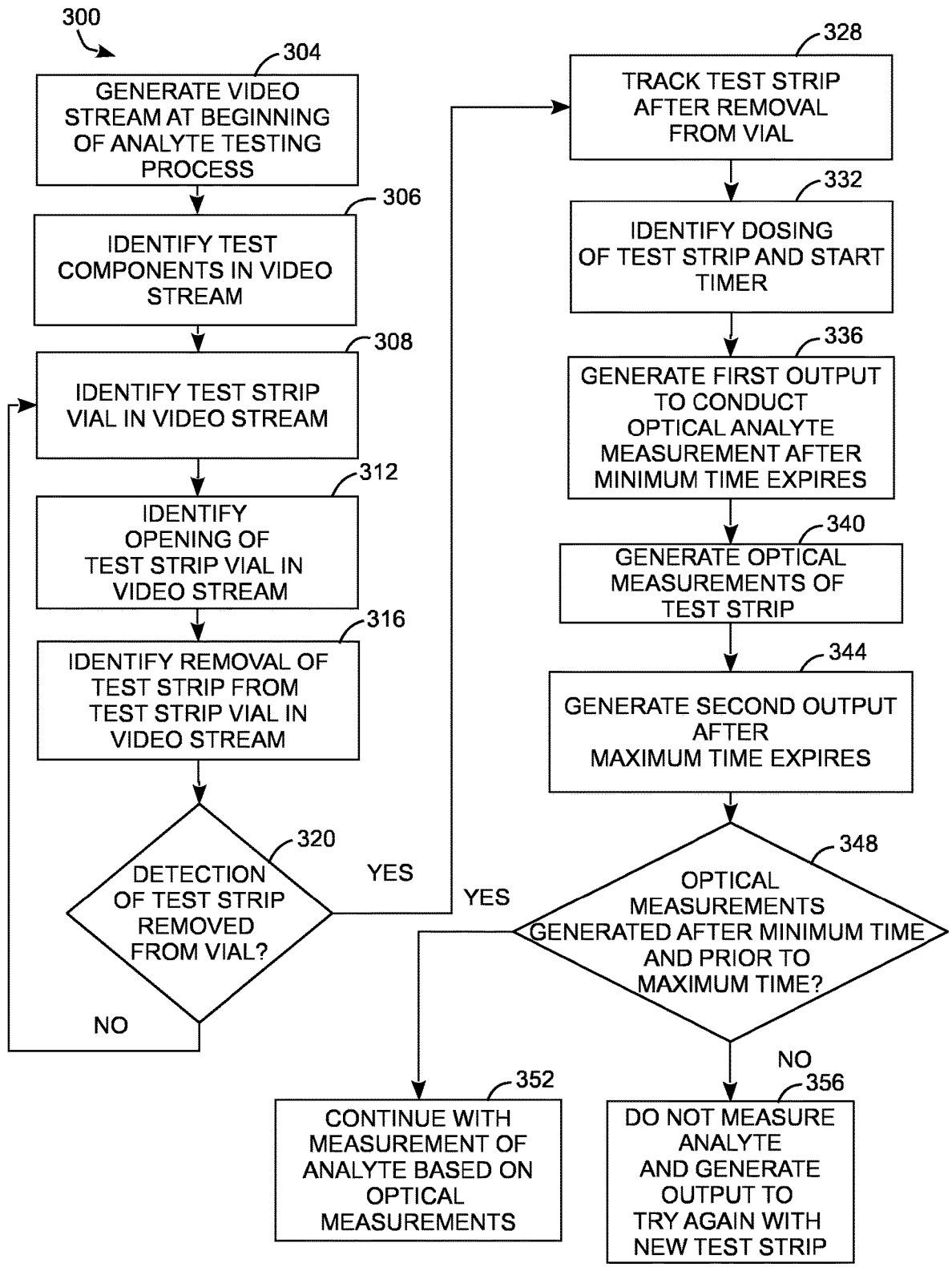
FIG. 3 is a block diagram of a process for the operation of the analyte measurement system.

FIG. 3 depicts a process 300 for operation of the system 100 to perform an automated analyte testing operation. By automated detection of different aspects of the operation, a user is freed from any requirement to interface, input, or manipulate a device in the system 100, and furthermore a more accurate analyte measurement is possible. For example, by automatically detecting when a fluid dose is applied to the deposit site of a test strip, it is possible to initiate an automated timing of when the system 100 should generate one or more images for optical measurements of the measurement site to measure a level of analyte in the fluid dose. In the description of the process 300, a reference to the process performing a function or action refers to the operation of one or more digital processors, such as the processors 204, 224 in the wearable electronic device 104 and the remote device 140, respectively, to cooperate to execute stored program instructions to perform the function or action in conjunction with other components in the system 100.

It will be apparent to those skilled in the art how independent processors may cooperate in the execution of stored program instructions, including the manner and location in which the program instructions may be stored in the memory of each device for which the respective processor cooperates with the other. For example, a remote device processor 224 executes locally stored program instructions to trigger wireless communication of program instructions to the wearable electronic device via the transceivers 228, 258, and the wearable electronic device memory 208 stores the received program instructions for immediate or delayed execution according to the instructions received from the remote device 140. Similarly, the remote device processor 224 may deliver instructions to the wearable electronic device processor 204 for directly triggering the execution, by the components of the wearable electronic device 104, various steps of an analyte measuring operation. In other embodiments, the remote device 140 controls the wearable electronic device in all aspects of execution of an analyte measuring operation, wherein the processor 224 delivers program instructions to the wearable electronic device 104 for immediate execution by the processor 204. In yet other embodiments, the memory 208 stores program instructions complementary or supplementary to the execution of the program instructions which may be received for immediate execution from the processor 224, wherein the complementary or supplementary program instructions are configured so that the execution by processor 204 of program instructions received from processor 224 may be interrupted based on real-time inputs or sensory observations by the components of the wearable electronic device 104 which dictate interruption and independent action by the wearable electronic device.

Cooperation between the processors 204, 224 in the execution of stored program instructions to perform the analyte measuring operation further may include the processor 204 causing transmission or communication of data, images, video streams or other information to the remote device processor 224 via exchange between transceivers 228, 258, wherein the remote device processor 224 executes locally stored program instructions pertaining to the further processing of information pertinent to the analyte measuring operation. In this way, the wearable electronic device 104 acts in a so-called servant capacity to the remote device 140 acting in a so-called master capacity.

The process 300 begins after the user initiates execution of the application software 250 in system 100, and the remote device 140 transmits a command to the wearable electronic device 104 to activate the camera 108 to generate a video stream of a scene in front of a user at the beginning of an analyte testing process (block 304). In the embodiment of FIG. 1, the wearable electronic device 104 transmits a video stream from the camera 108 to the remote device 140 using the transceiver 228, which enables the remote device processor 224 to receive the video stream for further processing using the corresponding transceiver 258. As is generally known in the art, the video stream includes a series of frames of image data that depict the view from the camera 108 over time during the analyte testing process.

The process 300 continues as the processor 224 automatically identifies the test components (vial 160, color card 180, and lancing device 192) in the video stream generated by wearable electronic device 104 and provides guidance to the user via HUD 116 of test components not identified (block 306). Guidance may take the form of a message or image designating the missing test components. For example, the image may be of the outline of the missing component or a designated image representing the missing component. Optionally, block 306 may repeat until all test components are identified.

Process 300 continues as processor 224 automatically identifies the vial 160 in the video stream generated by the wearable electronic device 104 (block 308). While numerous digital image processing techniques may be used to identify an object, such as the vial 160 or other objects that are detected in the video stream during the process 300, a non-limiting example of the preferred technique is described in further detail herein. The identification process for the vial 160 further includes an object tracking operation that segments different portions of frames in the video stream that contain objects and an object identification operation that uses an image classifier to identify the tracked objects.

In the object tracking operation, the processor 224 in the remote device 140 identifies and tracks one or more objects that are depicted in the video stream. To track objects, the processor 224 performs a contour detection operation that identifies the boundaries of various objects in the video stream that have similar image intensity values, including the boundaries of the vial 160. In some configurations, the processor 224 performs image pre-processing operations such as converting a color video stream to grayscale, thresholding of the grayscale pixels, and performing an edge detection processing to improve the accuracy of the contour detection process. The processor 224 segments the original image using, for example, rectangular bounding boxes that surround the detected contour areas, and the processor 224 performs the contour detection process over a series of video frames to track the movement of the object, such as when a user moves the vial 160. For example, as depicted in view 404 of FIG. 4, the video stream depicts the vial 160, and the processor 224 generates a rectangular bounding box 406 segment in a frame of the video stream that contains the detected contour of vial 160. While view 404 depicts the vial 160 in isolation, some frames in the video stream contain more than one object and the contour detection process described above enables tracking of multiple objects in the video stream.

Upon completion of the tracking operation, processor 224 has access to one or more image segments that contain objects, but the processor 224 has not yet determined the identity of specific objects, e.g. the processor 224 has tracked an object in the image segment 406 but has not yet identified that the object is the vial 160 or some other object. The object tracking process produces multiple image segments that can improve the accuracy of the image classifier for the detection of multiple relevant objects that may occupy different portions of a frame in the video stream. To complete the object identification process, the processor 224 provides the segmented portion of the image containing the tracked object as an input to a trained image classifier that is stored with the object recognition data 252 in the memory 232. The image classifier is, for example, a trained convolutional neural network (CNN) or other suitable image classifier that is trained to identify a predetermined set of objects, such as the vial 160 and interior of the vial lid 164, either side of the test strip 170, 171', the color card 180, or a finger 190. The training process for the image classifier occurs prior to the process 300 and, in particular, the image classifier is trained to recognize, either expressly or implicitly, the registration mark features that are formed on the vial 160, the interior of the vial lid 164, on either side of the test strip 170, and on the color card 180 to improve the accuracy of identifying the predetermined objects. Additionally, the training process can include training examples that occur when the registration marks are only partially visible to the camera 108, such as when a user holds the vial 160 in hand, which may occlude some of the registration marks 163. The processor 224 optionally performs additional pre-processing of the image data, which may include resizing the image data to a predetermined resolution, or performing a rotational transformation of the image based on metadata that are received from the positional sensors 112 in the wearable electronic device 104 that identifies the angular orientation of the camera 108 at the time each frame of the video stream is generated to improve the accuracy of the image classifier. In some configurations, the image classifier is trained using monochrome image data, but in other configurations a color image is preferred, including configurations in which registration marks are formed using predetermined colors that assist in image classification to identify an object. Extraneous objects that may be present in the video stream can be rejected as non-relevant by the image classifier as well. Additionally, because the video stream includes a series of frames, the system 100 can be configured to recognize the vial 160 in one or more frames of the video stream even if the tracking and identification process is not successful in a portion of the video stream frames. One example of a software framework that enables the image processing operations described above in the application software 250 is the Open Computer Vision (OpenCV) project that is available at https://opencv.org/. The process described above for identification of the vial 160 is substantially the same as the processes described below for the identification of other objects in the video stream during the process 300.

Figure 4:
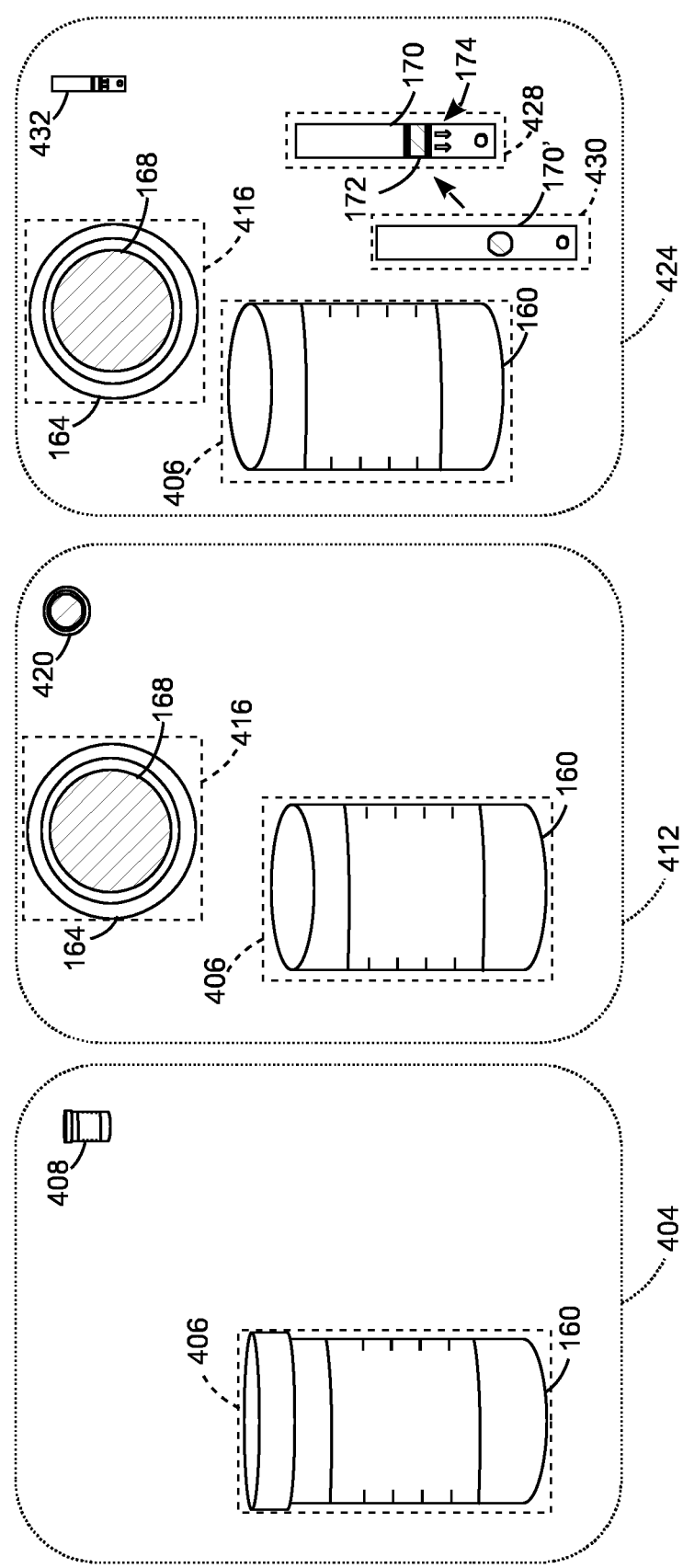
FIG. 4 is a series of views of a vial that holds test strips as the vial is opened and a test strip is removed from the vial.

During the vial identification process, the remote device 140 optionally transmits a graphical indicator, such as an icon, to the wearable electronic device 104 to assist the user in identifying the next step in the process for performing the test analysis. For example, the remote device 140 transmits a graphical icon that corresponds to the shape of the vial 160 to the wearable electronic device 104, and the wearable electronic device processor 204 generates a graphical display of the icon using the HUD 116 to alert the user to retrieve the vial 160 and place it in view of the camera 108 until the vial 160 is identified in the video stream. In FIG. 4, the view 404 depicts an exemplary icon 408 that the HUD 116 superimposes over the scene recorded by the camera 108 to prompt the user to retrieve the vial 160.

Referring again to FIG. 3, the process 300 continues as the remote device processor 224 identifies that the vial 160 is opened in response to detecting the registration mark formed 168 that is formed on the interior of the lid 164 in the vial 160 (block 312). Referring to FIG. 4, view 412 depicts the lid 164 that has been removed from the vial 160 with the registration mark 168 visible on the interior of the lid 164. The remote device processor 224 tracks and identifies the lid 164 within the image segment 416 in the same manner that is described above regarding the vial 160. Additionally, the remote device 140 optionally transmits an icon of the lid to the wearable electronic device 104, and the wearable electronic device 104 displays the icon 420 in the HUD 116 to provide guidance to the user.

Referring again to FIG. 3, the process 300 continues as the remote device processor 224 identifies that the test strip 170 has been removed by a user from the opened vial 160 (block 316). The remote device processor 224 tracks and identifies the test strip 170 within the image segment 428 in the same manner that is described above regarding the vial 160 and lid 164. Additionally, the remote device 140 optionally transmits an icon of the test strip to the wearable electronic device 104, and the wearable electronic device 104 displays the icon 432 in the HUD 116 to provide guidance to the user. In some instances, HUD 116 may also display textual or graphical alerts to the user on potential errors in strip handling as detected in the video stream. Examples of such errors may include leaving the vial open following strip extraction, or removing more than one strips. As depicted in FIG. 4, in some instances the user removes the test strip with the reverse side 170' visible to the camera 108. The remote device processor 224 tracks and identifies the reverse side 170' of the test strip in the region 430 and optionally generates an output message for the user via the HUD 116 or another output device 146 to rotate the test strip so that the side of the test strip 170 with the registration marks 174 and the deposit site 172 is visible in the video stream. The absence of the registration marks 174 on the reverse side 170' and optionally other different features of the reverse side 170' provide sufficient differences for the image classifier to distinguish the sides 170, 170' of the test strip. This operation is also performed at subsequent stages of the process 300 if the test strip 170 is flipped to expose the reverse side 170' prior to the test strip 170 receiving the fluid dose. While view 424 depicts the vial 160, interior of the lid 164, and the test strip 170 concurrently for illustrative purposes, the detection of removal of the test strip 170 from the vial 160 only requires a sequence of detecting the vial 160, lid interior 164, and the test strip 170 within the same video stream within a comparatively short period of time, such as a 10 second, 30 second, or 60 second time window. As such, the vial 160, lid 164, and test strip 170 do not need to be identified simultaneously in the video stream for the process 300 to identify that the test strip 170 has been removed from the vial 160.

During the process 300, if the remote device processor 224 fails to identify the sequence of the vial 160, the interior of the lid 164 indicating that the vial 160 is opened, or the removal of the test strip 170 within a predetermined period of time (block 320) then the process 300 returns to the processing described above with reference to block 308 to enable the user to repeat the process. Upon successfully identification that the test strip 170 has been removed from the vial 160 (block 320) the process 300 continues as the remote device processor 224 continues to track the test strip 170 that has been identified in the video stream (block 328). Alternatively, a user may opt out of the automatic process and initiate manually performing the operative activities of the overall process 300.

In one configuration, when the remote device processor 224 successfully identifies that the test strip 170 has been removed from the vial 160, a second timer is activated in order to count down a predetermined sample application time within which the user should apply a bodily fluid sample to a deposit site on the test strip. The predetermined sample application time is determined on the basis of an optimized time period after a test strip 170 is removed from the vial 160 and is exposed to the environment outside the vial before a bodily fluid sample is applied. If the user waits too long to apply the sample, the environmental exposure of the test strip may foul the test strip in a manner detrimental to an accurate and valid analyte measurement. The countdown that begins with the activation of the second timer continues until the remote device processor 224 confirms the application of the sample. If confirmation of sample application to the test strip occurs before the countdown is completed, the second timer is cancelled. If no confirmation of sample application occurs and the countdown expires, one or both of an audible and visual alarm is triggered to notify the user that the test strip has been exposed for too long and should be discarded. In some embodiments, the countdown may be displayed on the HUD 116 and/or the display 146 of the remote device 140.

In a similar fashion, the remote device processor 224 in another configuration tracks the vial 160 and the lid 164 in order to monitor and track whether the user has closed the lid. Closure of the lid 164 serves to protect the remaining test strips 170 in the vial 160 from exposure to the environment. In the event the remote device processor 224 does not detect that the lid 164 of the vial 160 has been closed after a test strip 170 has been removed from the vial, the remote device processor 224 may be configured to generate a textual or graphical alert to the user via the HUD 116 and/or the display 146 of the remote device 140 to remind the user to close the lid.

Figure 5:
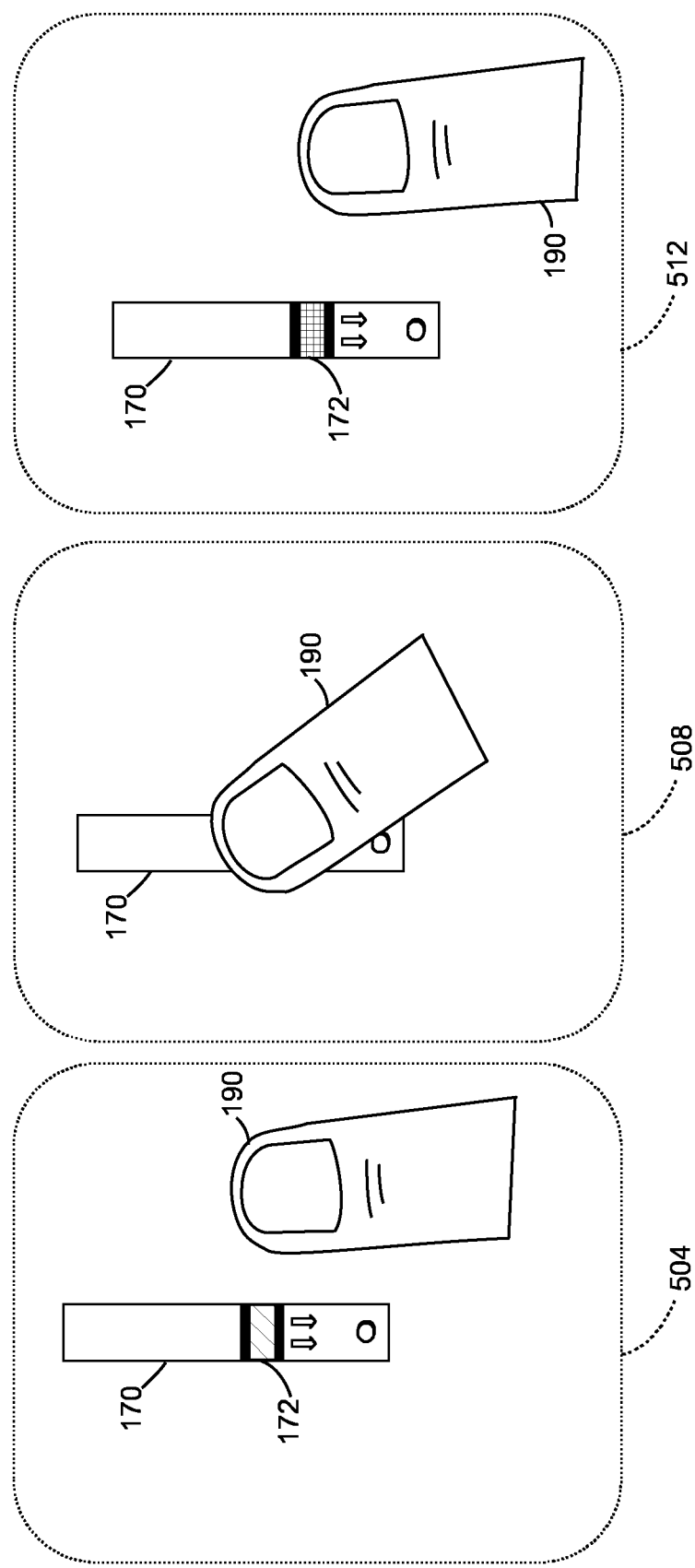
FIG. 5 is a series of views of a test strip that receives a fluid dose.
Figure 6:
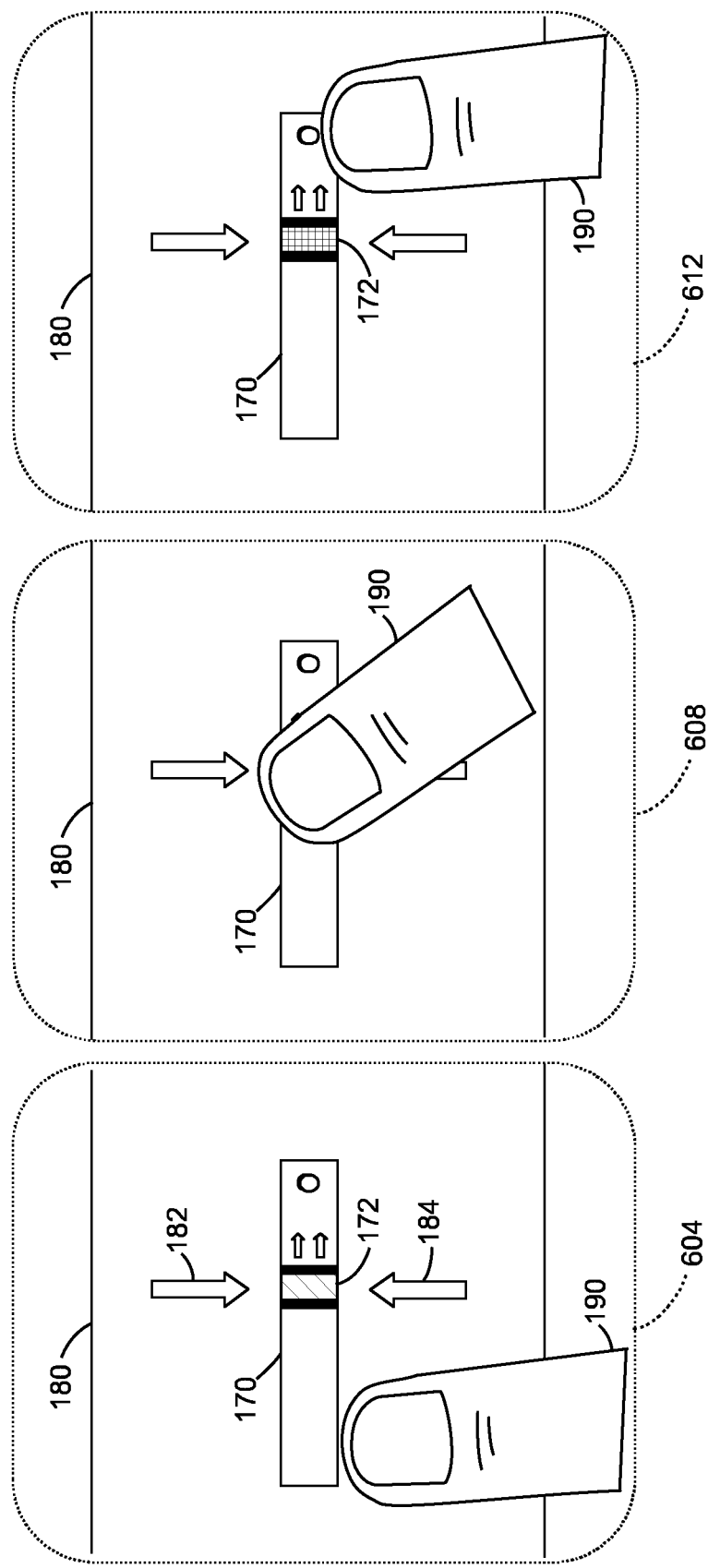
FIG. 6 is a series of views of a test strip that is placed in a color card to receive a fluid dose.

In one configuration, the remote device processor 224 tracks the test strip 170 in isolation as depicted in view 504 of FIG. 5. In another configuration that utilizes the color card 180, the remote device processor 224 identifies the color card 180 based at least in part on the registration mark arrows 182 and 184 and tracks the insertion by the user of the test strip 170 into the color card 180 as depicted in view 604 of FIG. 6. After identification of the test strip 170 and prior to the test strip 170 receiving the fluid dose, the remote device processor 224 instructs the wearable electronic device 104 to capture at least one image of the test strip, including the deposit site 172, and to store the at least one image in the memory 232. Instructions may include messaging and/or graphics provided via the HUD 116 to enable the user to handle the color card 180 in such a way as to properly distance and position the color card 180 having a test strip 170 optimally for angular orientation for the image of the blank deposit site 172 relative to the camera 108. As described in further detail below, at least one optical property of the deposit site 172 changes after the deposit site 172 receives the fluid dose, and the change in optical property enables detection of the time at which the test strip 170 receives the fluid dose.

The process 300 continues as the remote device processor 224 instructs the user via the HUD 116 to apply a liquid blood sample to the deposit site 172 of the test strip 170. Such instructions displayed on HUD 116 may indicate instructions for changing lancets, preparation of the stinging aid, and/or tips for stinging (i.e., stinging site, depth setting, or optimal size of blood drops). A user may then take steps to procure a liquid blood sample, such as by use of an appropriate lancing device for piercing the user's skin and procuring a source of the blood. Next, the user may grasp with one hand the test strip 170 or the color card 180 having the test strip positioned therein, and proceed to apply the fluid dose of blood from the pierced skin to the deposit site. Remote device processor 224 then, in one embodiment, identifies the application of the fluid dose to the deposit site on the test strip based on the video stream, and starts the timer 226 upon identification of the fluid dose application (block 332). In at least one embodiment, block 332 may also include remote device processor 224 detecting in the video stream any errors in the fluid dose application (i.e., blood not completely on deposit site, application of blood with pressure) and displaying guidance on HUD 116 of such errors and the potential for repeating the fluid dose application.

In one configuration, the remote device processor 224 identifies the finger 190 of the user in the video stream using the same procedure described above for identification of the vial 160, lid 164, test strip 170, and color card 180. The remote device processor 224 further identifies contact between the finger and the deposit site 172 in the video stream. For example, contact is identified in response to the finger 190 occluding the test strip 170 in the video stream as depicted in view 508 of FIG. 5 and view 608 of FIG. 6. After identification of the contact, the remote device processor 224 identifies that the fluid dose has been applied to the deposit side 172 based on a change in at least one optical property of the deposit site 172 in the video stream relative to the previously recorded images of the deposit site 172. Examples of optical properties of the deposit site 172 that change after the deposit site 172 receives the fluid dose include changes in one or more of color, contrast, and brightness of the deposit site 172 that occur due to the application of the fluid dose.

In a simplified configuration, the remote device processor 224 omits the identification of the finger 190 and contact between the finger 190 and the test strip 170 in the video stream. In this simplified configuration, the remote device processor 224 continues to track the test strip 170 until the detection of the change in the at least one optical property of the deposit site 172 to identify that the test strip 170 has received the fluid dose. In both configurations, the remote device processor 224 activates the timer 226 upon detection of the application of the fluid dose to the deposit site 172 on the test strip 170.

The process 300 continues as the timer 226 reaches a predetermined minimum time and the remote device processor 224 optionally generates an output signal to the user that the camera 108 should be used to generate one or more optical measurements of the measurement site 178 on the reverse side of the test strip 170' (block 336). The remote device processor 224 generates an output on a display touchscreen 146 of the remote device 140 or via the HUD 116 of the wearable computing device 104 to indicate that the optical measurement of the test strip should proceed as the camera 108 generates one or more optical measurements of the measurement site 178 (block 340). The user may then grasp the test strip 170 or color card 180 with one or both hands in order to position it relative to the camera 108 for optimal image capture conducive to the analyte measurement. In one aspect, the HUD 116 may provide graphical aids such as an outline for the augmented-reality based manner for positioning the test strip or color card. As such, the user moves the test strip or color card (or alternatively moves the orientation of the wearable electronic device) to be within the graphically-provided outline indicating optimal positioning in front of the camera 108. In a further aspect, processor 204 or 224 automatically detects that the test strip or color card is properly positioned within the outline and further automatically causes the camera 108 to capture an image for optical measurement. In other aspects, the user manually activates the camera 108 to capture the image for optical measurement when the user determines proper positioning of the test strip or color card within the graphically-provided outline.

The remote device processor 224 optionally generates an output that includes a countdown timer to indicate the amount of time remaining in the predetermined time window after the expiration of the minimum time period and prior to the expiration of the predetermined maximum time period to generate the optical measurements. In one configuration, the remote device processor 224 activates the camera 108 only after the timer 226 indicates that the predetermined minimum time period has expired, while in another configuration the remote device processor 224 only accepts optical measurements from the camera 108 that have a timestamp that falls within the predetermined time window. While the precise predetermined minimum and maximum time periods for generation of the optical measurements may vary between embodiments, in one configuration the minimum time period following the fluid dose is 13 seconds and the maximum time period is 45 seconds, which provides a 32 second time window for the camera 108 to produce one or more optical measurements of the measurement site 178.

After the timer 226 reaches the expiration of the predetermined maximum time period, the remote device processor 224 generates an output to indicate that the maximum time period has expired (block 344). If a sufficient number of images for optical measurements have been generated prior to the expiration of the predetermined maximum time period (block 348), then the remote device processor 224 continues execution of the analyte measurement process based on processing the optical measurements (block 352). In another configuration, if the camera 108 generates a sufficient number of optical measurements prior to the expiration of the predetermined maximum time period, then the remote device processor 224 optionally commences the measurement process of block 352 without waiting for the expiration of the timer 226. While not described in further detail herein, the analyte measurement process analyzes the color and optionally other optical properties of the reagent at the measurement site 178 on the test strip to determine the level of analyte in the fluid sample, such as the level of glucose in a blood sample. In configurations that use the color card 180, the remote device processor 224 uses additional optical data from the color card 180 to assist with the analyte measurement process. The remote device 140 causes the display of the measurement of the analyte level to the user via the display device 146, the HUD 116 in the wearable electronic device 104, or via another output device.

The system 100 and process 300 increase the reliability of the analyte measurement process because the user is able to more easily attain an optimized position of the test strip or color card in view of the camera 108 because the user is able to manually position them to the wearable electronic device 104 rather than awkwardly handle the remote device 140 to capture an image of the test strip or color card setting on a surface. The reliability of the process in other embodiments is also increased because the optical measurements are generated during the predetermined time window to ensure that the reagents in the test strip 170 have sufficient time to complete chemical reactions prior to the generation of the optical measurements but also do not experience dehydration or bleaching before the completion of the optical measurement process.

During the process 300, if the predetermined maximum time period expires prior to the generation of a sufficient number of optical measurements (block 348), then the remote device processor 224 does not continue with the analyte measurement process and the remote device 140 generates an output message, via the display device 146, the HUD 116 in the wearable electronic device 104, or via another output device, indicating that the analyte measurement cannot be completed and instructing the user begin the analyte testing process again using a new test strip (block 356).

As described above, process 300 performs object identification that begins with identification of the test strip vial 160 and the opening of the lid 164 in the video stream, which enables the system 100 to verify that the test strip 170 was extracted from the vial 160 instead of being a loose test strip that may have been outside of the vial 160 for a prolonged period of time. Some test strips may be contaminated if left outside of a vial for a prolonged period of time. However, in a simplified configuration of the process 300, the system 100 omits the identification of the test strip vial 160, the lid 164, and the extraction of the test strip 170 from the vial 160. The simplified configuration begins with the generation of the video stream and the identification of the test strip 170. In this configuration, the process 300 does not verify that the test strip 170 was extracted from a vial, which may not be necessary for some analyte testing systems. This simplified configuration of the process 300 is otherwise identical to the process described above.

It will be understood by those of ordinary skill in the art that the tracking and identification steps of process 300 are not essential to a viable operation of system 100 for performing an analyte testing operation. Programming and instructions provided by the remote device 140 via the display device 146, the HUD 116, or other output device for the testing operation may include sufficient information for a user to perform the entire operation manually rather than requiring the processors 204, 224 of the wearable electronic device 104 or the remote device 140 to track and identify particular acts pertaining to the testing operation. For example, initiation of a testing operation may be completed manually by the user via the wearable electronic device 108 or the remote device 140, followed by the user completing the steps without generation of a video stream of the operative actions, e.g. steps 312, 316, 332, and 340. Instead, the execution of the program for conducting the testing operation may be configured such that the user manually indicates completion of the main steps, e.g. dosing the test strip (indication of which may start the timer 226) and manually activates other system-based actions such as image capture using the camera 108.

In performing the analyte testing operation automatically as in process 300 or manually by a user initiating and completing the operative actions for analyte testing primarily using the wearable electronic device 104 of system 100, a user is freed from handling and using a handheld remote device 140 for the capturing of images of a dosed test strip 170' for the optical measurement thereof. In this way, the user may focus on handling the test strip and optionally the color card, obtaining a source of the bodily fluid sample, dosing at the deposit site, optionally positioning the test strip with a color reference, and image capturing. Advantages to the user include that it is easier for a user holding a test strip (or color card having a test strip positioned thereon) to properly and optimally position the distance and angle of the test strip/color reference in front of the camera 108 for accurate image capture, compared to manipulating a remote device 140 to a proper position over a test strip/color card set on a surface. A further advantage of this approach is that proper positioning of the test strip/color reference for image capture enables higher accuracy of the analyte measurement because the optical measurements based on the image of a dosed test strip are more robust.

Another advantage of primarily using a wearable electronic device 104 for completing the operative actions of a measurement process as described herein is that a dosed test strip/color card is held by a user rather than laid on a surface which may then be contaminated by a bodily fluid sample. Similarly, in the event the user's skin comes in contact with the bodily fluid sample dosed on the test strip, by completing the process using only the wearable electronic device 104 a user need not manually handle a remote device 140 and potentially spread contamination to that device.

Another advantage of using a wearable electronic device 104 for completing the operative actions of a measurement process as described herein is that the user is able gain feedback for accurately completing the measurement process without interrupting the process.

While the embodiments disclosed herein use a separate wearable electronic device 104 and remote device 140 for illustrative purposes, those of skill in the art will recognize that a single electronic device could be configured to perform the operations described herein. In particular, while state of the art wearable computing devices typically interface with a remote device for complex operations, more capable wearable computing devices could implement all of the functions described herein. Alternatively, the remote device 140 could be configured to perform all of the functions described herein using the optical sensor 142 as a camera to generate the video stream and perform the other processing that is described above. As such, specific references to the operations of the wearable electronic device processor 204 and the remote device processor 224 in the description above should be understood to alternatively refer to the operation of a single processor in alternative configurations that use a single electronic device. Notwithstanding the foregoing, as is typical in the state of the art for medical diagnostic analysis systems, results of analyte measurements may be transmitted, uploaded, or otherwise provided to a remote device 140 such as an internet-based or internet-connected data storage and processing location for purposes of data management, data backup, data processing using fit-for-purpose software applications and the like, and engagement and interfacing with healthcare providers or healthcare systems.

This disclosure is described in connection with what are considered to be the most practical and preferred embodiments. However, these embodiments are presented by way of illustration and are not intended to be limited to the disclosed embodiments. Accordingly, one of skill in the art will realize that this disclosure encompasses all modifications and alternative arrangements within the spirit and scope of the disclosure and as set forth in the following claims.

Embodiments include a system for measurement of an analyte, as well as methods for measuring an analyte.

In one embodiment there is provided a method for measuring an analyte using a wearable electronic device and a remote device operatively connected to each other and having processors configured to cooperate to execute program instructions to identify test components in the video stream; provide guidance to the user via the HUD of required test components not detected in the video stream; identify the application of a bodily fluid sample to a deposit site on a test strip based on the video stream; activate a timer in response to confirmation of the application of the bodily fluid sample; after a minimum period of time and before a maximum period of time from the activation of the timer, generating via the camera at least one image of the test strip including at least a portion of a measurement site, the at least one image being captured after guidance to the user via the HUD for positioning the test strip a predetermined distance and angular orientation relative to the camera; analyze optical properties of at least a portion of the measurement site within the image to determine a level of an analyte; and display the level of the analyte on the HUD.

In another embodiment, the method includes identifying a vial in the video stream generated by the camera based on at least one registration mark located on the vial depicted in the video stream; identifying an opening of the vial in the video stream based on at least one registration mark located on a lid of the vial; and identifying the extraction of the test strip from the vial after the identification of the opening of the vial in the video stream based on at least one registration mark associated with the test strip depicted in the video stream.

In another embodiment, the method includes identifying that a reverse side of the test strip is exposed in the video stream based on an absence of the indicator formed on the surface of the test strip; and generating on the HUD an output message indicating that the test strip should be rotated to expose the surface of the test strip bearing the indicator.

In a further embodiment, the method identifies a finger of a user in the video stream; generates guidance on the HUD for producing a bodily fluid sample following identification of the finger in the video stream; identifies contact between the finger and the deposit site in the video stream; and identifies the application of the fluid sample in response to a change in an optical property of the deposit site in the video stream after the contact between the finger and the deposit site.

In another embodiment, the program instructions proceed based on an automatic tracking of user activities and automatic identification of components required for the analyte testing operation, at least one of the first processor and second processor being configured for performing the automatic tracking and automatic identification via a video stream generated by the camera.

In another embodiment, the method identifies errors in extraction and handling of the test strip depicted in the video stream and provide guidance to the user via the HUD based on the errors. In a further embodiment, the step of identifying the application of a bodily fluid sample occurs following guidance to the user via the HUD for correct application of the bodily fluid to the test strip.

In another embodiment, the method includes activating a second timer in response to the user removing a test strip from a vial, wherein the second timer is configured to count down a predetermined sample application time within which the user is to apply the bodily fluid sample to the deposit site of the test strip. In one aspect, the method includes displaying on the HUD and/or a display on the remote device a dynamic countdown of the predetermined sample application time for visually indicating to the user the time remaining to apply the bodily fluid sample to the deposit site of the test strip. In another aspect, the method includes cancelling the second timer in response to confirmation of the application of the bodily fluid sample or sounding an audible and/or visual alarm in response to a failure to confirm the application of the bodily fluid sample.

In a further embodiment, the method comprises the step of initiating the program instructions using the wearable electronic device or the remote device, and providing guidance to the user regarding performance of the further steps of the method.

In yet another embodiment, the method comprises generating a video stream using the camera of the wearable electronic device, identifying one or more components required for the analyte testing operation including optionally a vial, one or more test strips, a color card, and a produced bodily fluid sample, and tracking user activities relating to said one or more components.

In yet further embodiments, the method comprises generating on the HUD an output message informing the user that the measurement of the analyte in the fluid dose cannot be completed in response to no optical measurement of the measurement site being generated after the predetermined minimum time period has elapsed and prior to the predetermined maximum time period elapsing.

In another embodiment, the method comprises displaying the level of the analyte on a display of the remote device.

In yet another embodiment, the wearable electronic device and/or the remote device are configured to receive and respond to voice communications from a user, wherein the method further comprises a user providing verbal commands directed to one or more of initiating the execution of program instructions by the devices for performance of the analyte testing operation, confirming extraction of a test strip, confirming placement of a test strip in a color card configured to hold the test strip, confirming production of a bodily fluid sample, confirming application of a bodily fluid sample at the dosing site of a test strip, generating a video stream, and generating one or more images exhibiting analyzable optical properties of the measurement site of a test strip having the bodily fluid sample applied thereon.

The invention claimed is:

1. A system for measurement of an analyte comprising:
  a wearable electronic device and a remote device, the wearable electronic device comprising:
    a camera configured to generate a video stream;
    a first communication transceiver configured to transmit and receive communications to and from a second communication transceiver at the remote device;
    a head-up display (HUD);
    a first memory configured to store program instructions; and
    a first processor operatively connected to the first communication transceiver, the camera, and the first memory, the first processor being configured to execute the program instructions;
  the remote device further comprising:
    a second memory configured to store program instructions; and
    a second processor operatively connected to the second transceiver and the second memory, the second transceiver configured to transmit and receive communications to and from the first communication transceiver;
  the wearable electronic device and the remote device being operatively connected to each other, wherein the first processor and second processor cooperate to execute the program instructions to:
    identify test components in the video stream and provide guidance to the user via the HUD of required test components not detected in the video stream;
    identify the application of a bodily fluid sample to a deposit site on a test strip based on the video stream;
    activate a timer in response to confirmation of the application of the bodily fluid sample;
    after a minimum period of time and before a maximum period of time from the activation of the timer, generating via the camera at least one image of the test strip including at least a portion of a measurement site, the at least one image being captured after guidance to the user via the HUD for positioning the test strip a predetermined distance and angular orientation relative to the camera;
    analyze optical properties of at least a portion of the measurement site within the image to determine a level of an analyte; and
    display the level of the analyte on the HUD.

2. The system of claim 1, wherein the program instructions proceed based on one or more inputs from the user upon completion of at least one of the steps of application of the bodily fluid sample to a deposit site of the test strip and generating the at least one image.

3. The system of claim 1, wherein the program instructions proceed based on an automatic tracking of user activities and automatic identification of components required for the analyte testing operation, at least one of the first processor and second processor being configured for performing the automatic tracking and automatic identification via a video stream generated by the camera.

4. The system of claim 3, wherein at least one of the first and second processors is further configured to:
  identify a vial in the video stream generated by the camera based on at least one registration mark located on the vial depicted in the video stream;
  identify an opening of the vial in the video stream based on at least one registration mark located on a lid of the vial; and
  identify extraction of the test strip from the vial after the identification of the opening of the vial in the video stream based on at least one registration mark associated with the test strip depicted in the video stream.

5. The system of claim 4, wherein the at least one registration mark associated with the vial further comprises an indicator formed on a label of the vial.

6. The system of claim 4, wherein the at least one registration mark associated with the test strip further comprises an indicator formed on a surface of the test strip at a predetermined position relative to the deposit site.

7. The system of claim 6, wherein at least one of the first and second processors is further configured to:
identify that a reverse side of the test strip is exposed in the video stream based on an absence of the indicator formed on the surface of the test strip; and
generate on the HUD an output message indicating that the test strip should be rotated to expose the surface of the test strip bearing the indicator.

8. The system of claim 3, where at least one of the first and second processors is further configured to identify errors in extraction and handling of the test strip depicted in the video stream and provide guidance to the user via the HUD based on the errors.

9. The system of claim 3, wherein at least one of the first and second processors is further configured to:
identify a finger of a user in the video stream;
generating guidance on the HUD for producing a bodily fluid sample following identification of the finger in the video stream;
identify contact between the finger and the deposit site in the video stream; and
identify the application of the fluid sample in response to a change in an optical property of the deposit site in the video stream after the contact between the finger and the deposit site.

10. The system of claim 3, wherein at least one of the first and second processors is further configured to identify the application of the fluid sample in response to a change in an optical property of the deposit site in the video stream.

11. The system of claim 3, wherein at least one of the first and second processors is further configured to generate on the HUD an output message informing the user that the measurement of the analyte in the fluid dose cannot be completed in response to no optical measurement of the measurement site being generated after the predetermined minimum time period has elapsed and prior to the predetermined maximum time period elapsing.

12. The system of claim 1, wherein the step of identifying the application of a bodily fluid sample occurs following guidance to the user via the HUD for correct application of the bodily fluid to the test strip.

13. The system of claim 1, the remote device further comprising a display operatively connected to the second processor, and wherein the operation further comprises displaying the level of the analyte on the display.

14. The system of claim 13, wherein the remote device comprises a mobile electronic device.

15. The system of claim 14, wherein the mobile electronic device comprises a smartphone where the program instructions comprise a software application stored on the second memory and executed by the second processor in communication with the first processor for directing the wearable electronic device in the performance of the analyte testing operation.

16. A method for measuring an analyte using a wearable electronic device and a remote device, the wearable electronic device having a camera and a head-up display (HUD), wherein the wearable electronic device and the remote device are operatively connected to each other and having processors configured to cooperate to execute program instructions to:
identify test components in a video stream;
provide guidance to the user via the HUD of required test components not detected in the video stream;
identify the application of a bodily fluid sample to a deposit site on a test strip based on the video stream;
activate a timer in response to confirmation of the application of the bodily fluid sample;
after a minimum period of time and before a maximum period of time from the activation of the timer, generate via the camera at least one image of the test strip including at least a portion of a measurement site, the at least one image being captured after guidance to the user via the HUD for positioning the test strip a predetermined distance and angular orientation relative to the camera;
analyze optical properties of at least a portion of the measurement site within the image to determine a level of an analyte; and
display the level of the analyte on the HUD.

17. The method of claim 16, further comprising generating a video stream using the camera of the wearable electronic device, identifying one or more components required for the analyte testing operation including optionally a vial, one or more test strips, a color card, and a produced bodily fluid sample, and tracking user activities relating to said one or more components.

18. The method of claim 16, further comprising identifying a vial in the video stream generated by the camera based on at least one registration mark located on the vial depicted in the video stream; identifying an opening of the vial in the video stream based on at least one registration mark located on a lid of the vial; and identifying the extraction of the test strip from the vial after the identification of the opening of the vial in the video stream based on at least one registration mark associated with the test strip depicted in the video stream.

* * * * *